Feb. 26, 1929.

T. A. MOUNTFORD 1,703,685

METHOD OF MAKING TOPS FOR JEWEL SETTINGS

Filed Feb. 10, 1928

INVENTOR:
Thomas A. Mountford,
By Attorneys,
Fraser, Myers & Manley

Patented Feb. 26, 1929.

1,703,685

UNITED STATES PATENT OFFICE.

THOMAS A. MOUNTFORD, OF NEWARK, NEW JERSEY, ASSIGNOR TO BLANCARD & CO., INC., OF NEW YORK, N. Y., A CORPORATION OF NEW JERSEY.

METHOD OF MAKING TOPS FOR JEWEL SETTINGS.

Application filed February 10, 1928. Serial No. 253,327.

The present invention relates to the method of making a top for a jewel setting, and aims to provide certain improvements therein. Specifically it relates to making a top for a jewel setting having what is known as hairline piercings, inwardly of and in proximity to the outer edge of the setting.

A top for a jewel setting is a constituent part of a jewel mounting, which is conventionally made entirely of precious metal. Hence in the manufacture of such articles a high degree of care is exercised to avoid waste of metal in any of the operations.

Heretofore, articles of this kind have been made from two or more parts which were assembled by hand processes involving soldering, welding, filing and the like, which, in view of the usual small dimensions of the parts, required a high degree of care and skill and thus added materially to the cost of the articles.

According to the present invention I form articles of the kind described without employing any soldering or welding operations, hence obviating any filing away of superfluous metal due to the soldering or welding. This I accomplish by forming the articles from a pair of parts or members in such manner that they can be quickly and efficiently assembled in suitable dies. In a preferred embodiment of my invention the article is constructed from a pair of complementary members, one designed to encompass the other, one of said members having tongues and the other having recesses for receiving said tongues, and in so preparing said tongued and recessed members that they may be assembled in suitable dies and united together by a stamping operation which forces the tongues into the recesses and then swages the assembled parts together. The invention also embodies other features of novelty which will be hereinafter more fully described.

One embodiment of my invention and a preferred manner of practicing the same is illustrated in the accompanying drawings, wherein Figure 1 is a top plan view of one of the members.

Figs. 9, 10, 11 and 12 are sections of Figs. 3, 4, 5 and 6 taken along the lines 9—9, 10—10, 11—11 and 12—12 respectively.

Figure 6:
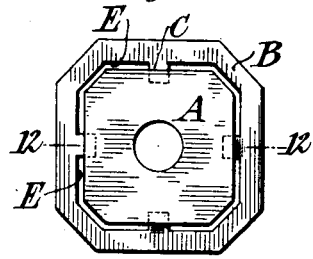
Fig. 6 is a top plan view of the parts shown in Figs. 3 and 4 in assembled relation.
Figure 12:
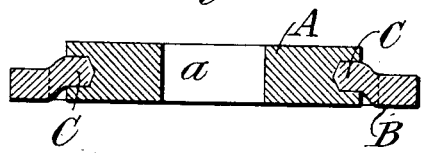

The top for the jewel setting exemplified in the present application is shown in top plan view by Fig. 6, and in transverse section by Fig. 12. This setting top is formed of two complementary parts or members A and B, the latter being designed to encompass the former and to be united in spaced relation thereto except at the points of connection therebetween and designated C. As shown in the drawings, the member A is a relatively thick, square blank having a central opening $a$ and its corners chamfered off, as shown at $a'$, while B is a relatively thin stamping having an outline similar to the outline of the member A and formed on its inner perimeter or edge with the lateral inwardly-directed tongues C. These members A and B can be stamped from sheet metal by suitable dies.

Figure 1:
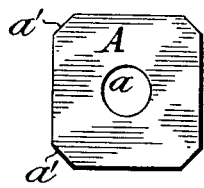
Figure 2:
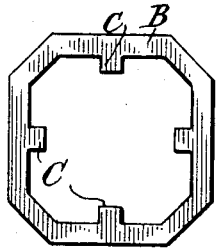
Fig. 2 is a top plan view of the other complementary part or member.
Figure 3:
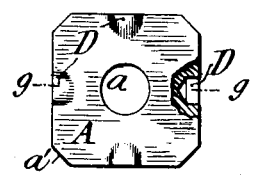
Figs. 3 and 4 are top plan views respectively of the members shown in Figs. 1 and 2 after having been operated upon by suitable dies.
Figure 7:
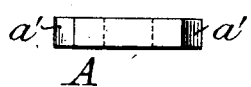
Figs. 7 and 8 are side views respectively of Figs. 1 and 2.
Figure 8:
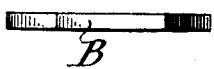
Figure 9:

In order that the members A and B may be united without the aid of a soldering or welding operation, I form in the sides constituting the outer peripheral wall of the member A, recesses D adapted to receive the tongues C of the member B. The recesses D, as shown, are located at the middle of each of said sides and are preferably formed by indenting said sides at said points to strike up the metal from the top and bottom faces of the blank, as best shown in Figs. 3 and 9.

Figure 4:
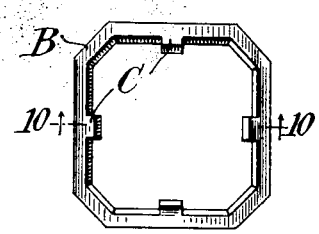
Figure 5:
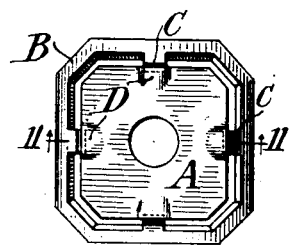
Fig. 5 is a top plan view of the members shown in Figs. 3 and 4 in position preparatory to being assembled together.
Figure 10:
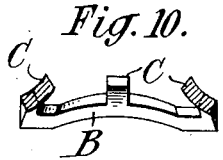
Figure 11:
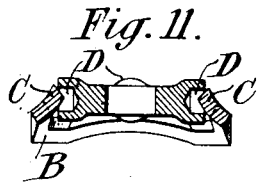

The ends of the tongues C of the flat blanks B normally project inwardly to an extent which would preclude their insertion in the recesses D, hence, in order to make such insertion possible, said tongues are either bent out of the plane of the blank, or the member B as a whole is cupped, as shown in Figs. 4 and 10, thereby moving the ends of the tongues C relatively outwardly a distance sufficient to bring them approximately into coincidence with the openings in the peripheral walls of the member A when the member A is placed over the member B, as shown in Figs. 5 and 11. In this position it will be apparent that the ends of the tongues and the tops of their complementary recesses are located substantially equal distances from a common central point.

To assemble the members A and B, they are positioned in suitable dies to assume the relation shown in Figs. 5 and 11, wherein the tops of the tongues lie in close proximity to their complementary recesses, and said dies being such that when they are brought toward each other they cause the tongues, for only a portion of their length, to engage in the recesses, after which the engaged portions of the tongues and the metal surrounding the recesses are swaged together to render the parts non-separable, by the same or a subsequent stamping or assembling operation.

An inspection of the members A and B in assembled relation, as best shown in Figs. 6 and 12, shows that they are peripherally separated from one another by a narrow space or hair line piercing E except at the points of union C provided between the members. Obviously this hair line piercing may be made narrower or wider, and also a greater or lesser number of points of union between the members may be employed. It will also be apparent that the shapes and contours and the respective members on which the tongues and grooves are formed may be varied as desired and that instead of cupping the member B in a separate operation, said member might be originally made in cupped form.

From the foregoing description it will be apparent that I have provided a novel method for making a top for a jewel setting, and although I have shown and described the invention as applied to but a single form of setting top, it is to be understood that the concept underlying the present invention is applicable to other structures, and I therefore do not wish to be limited to the specific embodiment here disclosed since modifications thereof may be resorted to without departing from the spirit of the invention.

What I claim is:

1. A method of making a jewel setting top having hair line piercings that comprises forming two complementary members, one with tongues and the other with recesses for receiving said tongues, positioning said members in spaced relation with the tongues of the one in complemental relation to the recesses in the other, and causing said tongues to engage in said recesses to hold said members in assembled relation without bringing the complementary wall into contact with each other.

2. A method of making a jewel setting top having hair line piercings that comprises forming two members, one designed to encompass the other in spaced relation, one of said members being formed with laterally-extending tongues and the other with peripheral recesses for receiving said tongues, and causing said tongues to engage in said recesses by a stamping and swaging operation to hold said members in assembled relation while retaining the two members in encompassing spaced relation except at the points of their tongue and recess engagements.

3. A method of making an article of the character described, that comprises forming two members, one of which is designed to encompass the other and be in spaced relation thereto except at the points of connection therebetween, one of said members being formed with tongues and the other with peripheral recesses for receiving said tongues, the complementary points of assembly of each tongue and recess of said members being approximately equal distances from a common point thereof, positioning said members in suitable dies, with the tips of the tongues of the one member in close proximity to the recesses in the other member and causing said tongues to engage for only a portion of their length in said recesses.

4. A method of making an article of the character described, that comprises forming two members, one of which is designed to encompass the other and be in spaced relation thereto except at the points of connection therebetween, one of said members being cup-shaped in form and provided with tongues, and the other being formed with indented or struckup recesses in its peripheral wall for receiving said tongues, the complementary points of assembly of each tongue and recess of said members being approximately equal distances from a common point thereof, positioning said members in a suitable stamping die with the tips of the tongues of the one member in close proximity to the recesses in the other member and stamping said members together, thereby causing said tongues to non-removably engage in said recesses.

5. A method of making an article of the character described, that comprises forming two members of different thicknesses, one of which is to encompass the other and be in spaced relation thereto except at the points of connection therebetween, the thinner of said members being cupped in form and provided with integral tongues, the thicker of said members being formed with recesses in its peripheral wall for receiving the tongues on the thinner member, the complementary points of the ends of said tongues and the recesses before assembly being located substantially equal distances from a common point, positioning said members in suitable swaging dies so that the tips of the tongues lie in close proximity to their complementary recesses, said dies being such that when they are brought toward each other they cause the tongues to engage in the recesses wherein they are swaged and rendered non-removable.

6. The method of uniting together two metal members having complementary shaped walls to provide hair line piercings therebetween, that comprises forming the wall of one of the members with a tongue, and the complementary wall of the other member with a recess for receiving said tongue, positioning said members with their complementary walls in spaced relation and with the tongue of one engaging in the recess in the other, and securing said members together at said tongue and recess by a stamping operation while retaining the complementary edges in spaced relation.

7. The method of uniting together two metal members having complemental edges to provide hair line piercings therebetwen, that comprises forming the edge of one of the members with a tongue, and the edge of the other member with a recess for receiving said tongue, positioning said members in spaced relation with the tongue of one in complemental relation to the recess in the other, and securing said members together at said tongue and recess by causing a displacement of the metal at said points while retaining the complementary edges in spaced relation.

In witness whereof, I have hereunto signed my name.

THOMAS A. MOUNTFORD.

CERTIFICATE OF CORRECTION.

Patent No. 1,703,685.  Granted February 26, 1929, to

THOMAS A. MOUNTFORD.

It is hereby certified that error appears in the printed specification of the above numbered patent requiring correction as follows: Page 2, line 56, claim 1, for the word "wall" read "walls"; page 3, line 14, claim 6, for the word "edges" read "walls"; and that the said Letters Patent should be read with these corrections therein that the same may conform to the record of the case in the Patent Office.

Signed and sealed this 26th day of March, A. D. 1929.

(Seal)

M. J. Moore,
Acting Commissioner of Patents.